United States Patent
Haslbeck et al.

(10) Patent No.: US 12,450,526 B2
(45) Date of Patent: *Oct. 21, 2025

(54) SYSTEMS AND METHODS FOR PREDICTING CORRECT OR MISSING DATA AND DATA ANOMALIES

(71) Applicant: Collibra Belgium BV, Brussels (BE)

(72) Inventors: Kirk J. Haslbeck, Woodbine, MD (US); Brian N. Mearns, Falls Church, VA (US)

(73) Assignee: Collibra Belgium BV, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,036

(22) Filed: Jun. 11, 2024

(65) Prior Publication Data
US 2024/0420033 A1    Dec. 19, 2024

Related U.S. Application Data

(63) Continuation of application No. 18/160,179, filed on Jan. 26, 2023, now Pat. No. 12,008,453, and a
(Continued)

(51) Int. Cl.
*G06N 20/20* (2019.01)
*G06F 16/215* (2019.01)

(52) U.S. Cl.
CPC .......... *G06N 20/20* (2019.01); *G06F 16/215* (2019.01)

(58) Field of Classification Search
None
See application file for complete search history.

(56) References Cited

U.S. PATENT DOCUMENTS

| 8,688,603 B1 | 4/2014 | Kurup et al. |
| 10,733,515 B1 | 8/2020 | Mishra et al. |

(Continued)

FOREIGN PATENT DOCUMENTS

| CN | 108304854 A | 7/2018 |
| CN | 110083593 A | 8/2019 |
| CN | 111695639 A | 9/2020 |

OTHER PUBLICATIONS

PCT/EP2022/058921, International Search Report and Written Opinion, mailed Aug. 1, 2022, 16 pgs.
(Continued)

*Primary Examiner* — Irene Baker
(74) *Attorney, Agent, or Firm* — Perkins Coie LLP

(57) ABSTRACT

The present disclosure is directed to systems and methods for predicting and correcting data anomalies. In one example aspect, data is received by the system. The system may analyze the data by profiling the data for certain profiling statistics (e.g., min, max, mean, cardinality, etc.). At least one machine-learning algorithm (e.g., a Random-Forest algorithm) may be applied to the profiled data to identify potential relationships among certain data columns in the data. Once certain relationships are identified, the data that is related may be extracted to form an itemset. A second machine-learning algorithm (e.g., Frequent Pattern Growth algorithm) may be applied to the itemset to identify certain frequencies of related values in the itemset. Low frequency values may indicate anomalies in the dataset. If an anomaly is detected, the system may be configured to provide an intelligent remedial action, such as substituting certain values and/or filling in a missing value.

20 Claims, 8 Drawing Sheets

Related U.S. Application Data continuation of application No. 17/236,823, filed on Apr. 21, 2021, now Pat. No. 11,568,328.

(56) References Cited

U.S. PATENT DOCUMENTS

| | | | |
|---|---|---|---|
| 11,568,328 | B2 | 1/2023 | Haslbeck et al. |
| 12,008,453 | B2 | 6/2024 | Haslbeck et al. |
| 2013/0226842 | A1 | 8/2013 | Chu et al. |
| 2015/0088907 | A1* | 3/2015 | Li .................... G06F 16/24554 707/749 |
| 2017/0372232 | A1 | 12/2017 | Maughan et al. |
| 2019/0287032 | A1* | 9/2019 | Seabolt ............... G06F 16/2379 |
| 2019/0303472 | A1* | 10/2019 | Drescher ............. G06F 16/2365 |
| 2019/0392075 | A1* | 12/2019 | Han ..................... G06F 16/285 |
| 2020/0219006 | A1* | 7/2020 | Wang .................... G06N 20/00 |
| 2020/0349169 | A1 | 11/2020 | Venkatesan et al. |
| 2021/0182602 | A1 | 6/2021 | V et al. |
| 2021/0182698 | A1* | 6/2021 | Le Biannic ............. G06F 16/36 |
| 2021/0304047 | A1 | 9/2021 | Alattas et al. |
| 2021/0342738 | A1* | 11/2021 | Sarferaz ................ G06Q 10/10 |
| 2021/0357699 | A1 | 11/2021 | Saillet et al. |
| 2022/0044133 | A1* | 2/2022 | Otto ........................ G06N 5/04 |
| 2022/0172087 | A1 | 6/2022 | Guzik et al. |
| 2022/0222570 | A1 | 7/2022 | Rout et al. |
| 2022/0237208 | A1 | 7/2022 | Srinivasan et al. |
| 2022/0253647 | A1 | 8/2022 | Perkins |
| 2022/0342867 | A1 | 10/2022 | Haselbeck et al. |
| 2023/0153582 | A1 | 5/2023 | Sahraeian et al. |

OTHER PUBLICATIONS

Abedjan Ziawasch et al: "Profiling relational data: a survey", VLDB Journal, Springer Verlag, Berlin, DE, vol. 24, No. 4, Jun. 2, 2015 (Jun. 2, 2015), pp. 557-581, XP035514145, ISSN: 1066-8888, DOI: 10.1007/S00778-015-0389-Y.

* cited by examiner

SYSTEMS AND METHODS FOR PREDICTING CORRECT OR MISSING DATA AND DATA ANOMALIES

CROSS-REFERENCE TO RELATED APPLICATION

This patent application is a Continuation of U.S. patent application Ser. No. 18/160,179, filed Jan. 26, 2023, entitled "SYSTEMS AND METHODS FOR PREDICTING CORRECT OR MISSING DATA AND DATA ANOMALIES," which is a Continuation of U.S. Non-Provisional patent application Ser. No. 17/236,823, filed Apr. 21, 2021, entitled "SYSTEMS AND METHODS FOR PREDICTING CORRECT OR MISSING DATA AND DATA ANOMALIES," the disclosures of which are incorporated herein by reference in their entirety.

TECHNICAL FIELD

The present disclosure relates to systems and methods for predicting correct or missing data, data anomalies, and overall data quality using associative machine learning algorithms, such as Random Forest and Frequent Pattern Growth.

BACKGROUND

Entities maintain large amounts of data that may have relationships (or associations) with certain data classifications. Such entities may struggle to understand the attribute relationships within a dataset, as well as struggle to validate record-level information as compared to column-level validation. For example, a zip code is usually associated with a street address and a state. An entity may have a valid zip code and a valid state code, but together, the zip code and state code do not form a valid record (e.g., because the zip code is not located within the state). Within these datasets, data anomalies, like the one just described, may be present. Presently, entities must manually identify these data anomalies by determining whether certain data points are actually anomalies or not. To make this determination, entities typically must identify certain relationships among data points (e.g., zip codes are associated with street addresses and have a certain numerical format consisting of nine digits). Identifying these relationships in a dataset is cumbersome and time-consuming. The current process of attempting to identify relationships also yields errors because manual identification of data relationships often times overlooks or simply misses a relationship between certain data points. As such, current methods of identifying data anomalies is inconsistent and inefficient, in part, because identifying a data anomaly usually requires an assessment of a relationship between data points (or lack thereof). If certain data that is received looks unusual to previous data received, then this may indicate an anomaly, but it may also be a false-positive. Similarly, certain data is received that is not frequently received from a certain entity may also indicate an anomaly, or, alternatively, it may not be an anomaly but simply a less frequently received data point. Disentangling large datasets to identify data anomalies is necessary for predicting the data quality of a dataset, and presently, because today's methods of identifying data anomalies are prone to error and inefficient, accurately predicting the correct or missing data for a given record, and overall data quality of a dataset is difficult and unreliable.

As such, there is an increased need for systems and methods that can address the challenges of identifying data anomalies, identifying data relationships, and predicting the correct dataset accurately and efficiently.

It is with respect to these and other general considerations that the aspects disclosed herein have been made. Also, although relatively specific problems may be discussed, it should be understood that the examples should not be limited to solving the specific problems identified in the background or elsewhere in the disclosure.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Figure 1:
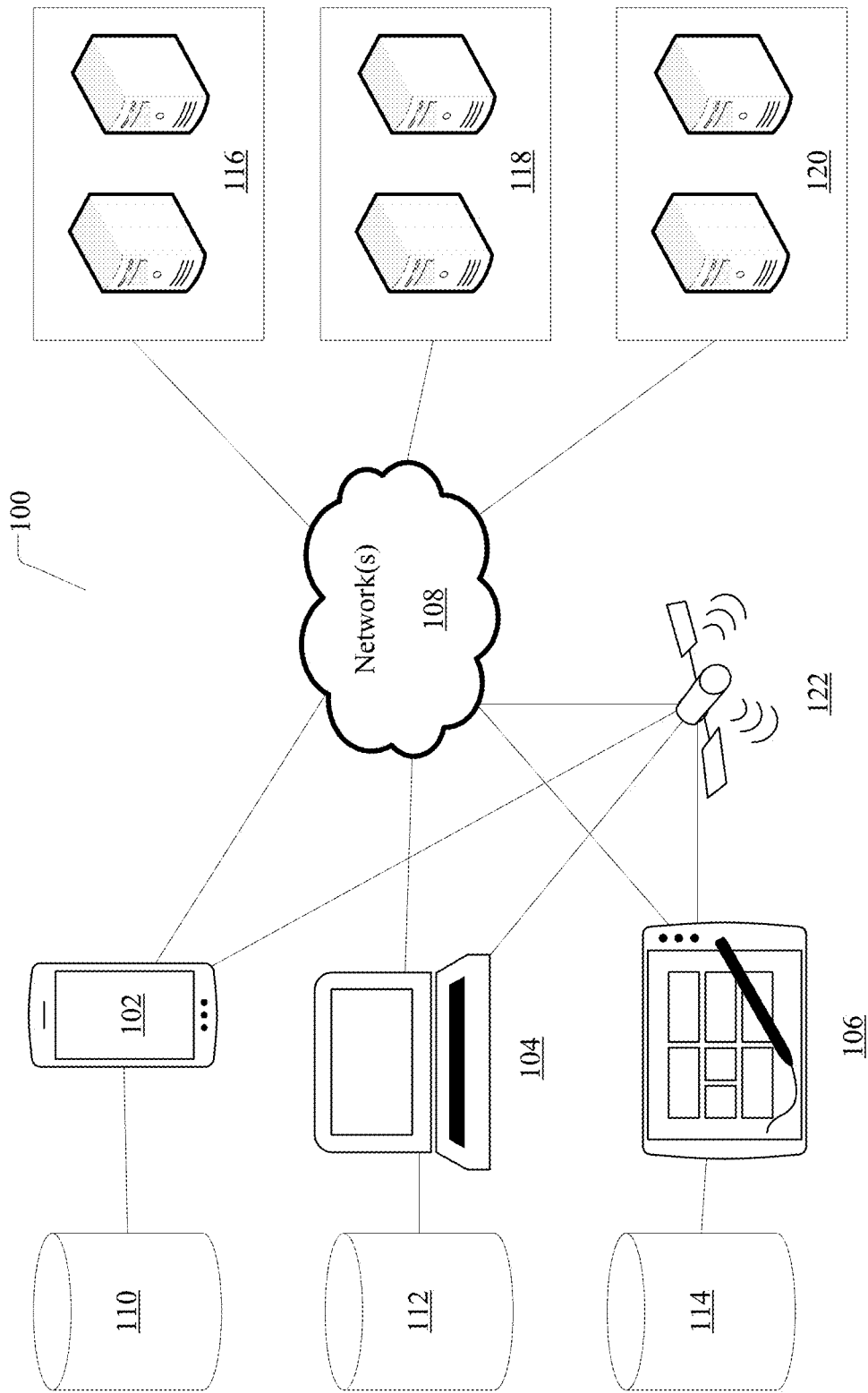
FIG. 1 illustrates an example of a distributed system for a predicting correct or missing data, and data quality, as described herein.

FIG. 1 illustrates an example of a distributed system for a predicting correct or missing data, and data quality, as described herein. Example system 100 presented is a combination of interdependent components that interact to form an integrated whole for consolidating and enriching data on a data marketplace. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain client-specific data. Client devices may also be configured to receive from a variety of data sources (e.g., data lakes, databases, flat files, data streams, etc.) via network(s) 108 that may be ingested and analyzed at the client devices 102, 104, and/or 106. The received data may be stored in local databases 110, 112, and 114. The received data may be analyzed by applying at least one machine-learning (ML) algorithm to the data. The received data may be transmitted via network(s) 108 and/or satellite 122 to server(s) 116, 118, and/or 120. Server(s) 116, 118, and/or 120 may be third-party servers and/or client-owned servers. Data may be transmitted to server(s) 116, 118, and/or 120 for further processing, analysis, and/or storage, depending on, e.g., the size of the data, the complexity of the analysis to be conducted on the data, etc. In other examples, the received data may be stored in servers (in addition to or instead of local client devices and local databases) and may be analyzed to determine correct or missing data, and data quality of the dataset. The received data, along with a data quality predictor (e.g., score, table, etc.), may be transmitted from client servers to third-party servers via network(s) 108 and/or satellite 122.

In aspects, a client device, such as client devices 102, 104, and 106, may have access to one or more datasets or data sources and/or databases comprising customer-specific data. In other aspects, client devices 102, 104, and 106, may be equipped to receive broadband and/or satellite signals carrying customer data. The data may be comprised of a raw dataset, an already-analyzed dataset (e.g., that has received application of at least one ML algorithm), and/or a mixture of both. The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices.

To further elaborate on the network topology, client devices 102, 104, and/or 106 (along with their corresponding local databases 110, 112, and 114) may receive data from a customer. On the client devices 102, 104 and/or 106, a profiler and/or rules engine may be installed and applied to the received data. Comparison and analysis of the received data may occur locally on client devices 102, 104, and/or 106. In alternative embodiments, the received data may be compared and analyzed at server(s) 116, 118, and/or 120. Once compared and analyzed, the received data may be manipulated to identify which data columns have the strongest relationships between them. In some examples, a predictive relationship/association indicator may be generated. This predictive indicator may be generated at client device(s) 102, 104, and/or 106, server(s) 116, 118, and/or 120, or a combination of both. The predictive indicator output may be generated locally or externally and shared via network(s) 108.

Once associations of a dataset have been identified, a transactional itemset may be generated. The itemset may be generated at client device(s) 102, 104, and/or 106, or externally at server(s) 116, 118, and/or 120. The transactional itemset may then be analyzed using a second ML algorithm (e.g., Frequent Pattern Growth (FPG) algorithm) to identify the frequency of the identified data associations. A data quality indicator may be generated, which indicates which data associations may be less frequent and are present in the dataset. Less frequent data associations may suggest a data anomaly. This output may be generated locally at client device(s) 102, 104, and/or 106 and/or server(s) 116, 118, and/or 120. Regardless of where the DQ output is generated, the DQ output may be shared with various devices via network(s) 108.

Figure 2:
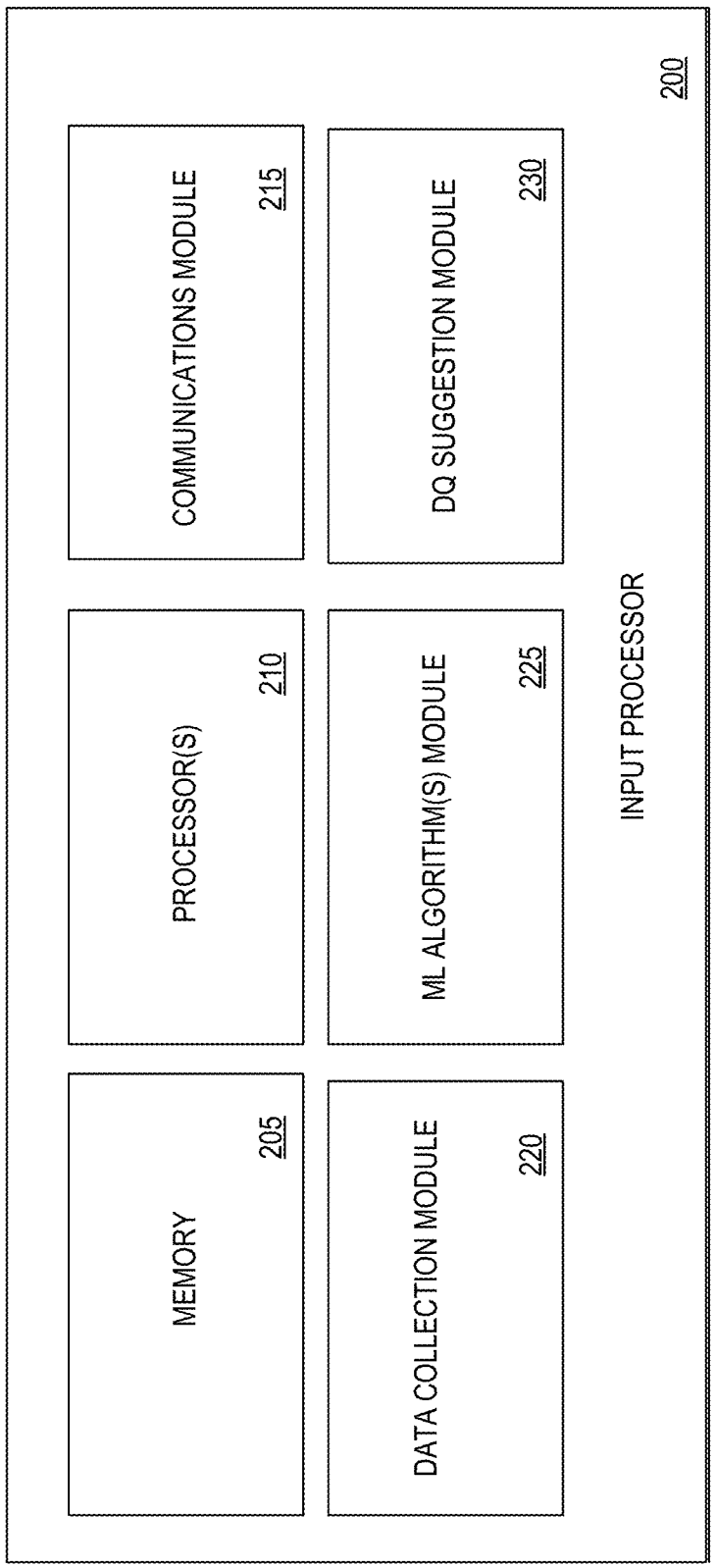
FIG. 2 illustrates an example input processor for predicting correct or missing data, and data quality, as described herein.

FIG. 2 illustrates an example input processor for predicting correct or missing data, and data quality, as described herein. Input processor 200 may be embedded within a client device (e.g., client devices 102, 104, and/or 106), remote web server device (e.g., devices 116, 118, and/or 120), and other devices capable of implementing systems and methods for predicting correct or missing data, and data quality. The input processing system contains one or more data processors and is capable of executing algorithms, software routines, and/or instructions based on processing data provided by at least one data source (e.g., data lake, database, flat file, data stream, etc.). The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc.

According to embodiments shown in FIG. 2, the disclosed system can include memory 205, one or more processors 210, communications module 215, data collection module 220, ML algorithms module 225, and data or DQ suggestion module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of data collection module 220, ML algorithms module 225, and/or data/DQ suggestion module 230, as well as communications module 215. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Communications module 215 is associated with sending/receiving information (e.g., data collected by data collection module 220, data analyzed/processed according to ML algorithm module 225, and/or predictive correct or missing data, and data quality information from DQ suggestion module 230), commands received via client devices or server devices, other client devices, remote web servers, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 215 sends information (e.g., data) collected by data collection module 220 (e.g., batch, bulk, and/or continuous feed of data), processed by ML algorithm module 225 (e.g., a dataset may be profiled and analyzed for predictive associations using a Random Forest algorithm and further analyzed for frequency of associations using a Frequent Pattern Growth algorithm), and output generated by DQ suggestion module 230 (e.g.,), and/or to client devices 102, 104, and/or 106, as well as memory 205 to be stored for future use. In some examples, communications modules may be constructed on the HTTP protocol through a secure REST server(s) using RESTful services.

Data collection module 220 is configured to receive and profile data. For example, data collection module 220 may receive data associated with a dataset. Data collection module 220 may then profile the data, including capturing statistics, including but not limited to minimum(s), maximum(s), cardinality, confidence frequencies, and categorical value encodings, among other statistics. In some examples, cardinality may refer to the number of distinct values that is captured in a dataset.

Data collection module 220 may also be configured to identify certain data values that inherently low confidence, low support, and/or high frequencies. Such data values may be excluded by data collection module 220 prior to sending such data values to ML algorithm module 225.

ML algorithm(s) module 225 is configured to receive a dataset and apply at least one machine-learning (ML) algorithm to that dataset. For instance, after a data set is received and profiled by data collection module 220, the dataset may be transmitted to ML algorithm module 225. ML algorithm module 225 may be configured to analyze the dataset and, in particular, the columns of the dataset. Each column label may be compared to other columns to identify relationships among the columns in a dataset.

In order to identify the relationships among the columns, ML algorithm module 225 may apply a Random Forest (RF) algorithm to the dataset. The features and attributes required for initiating/building ML algorithms can be attained during profiling or other analytical steps. A dataset may first be profiled, and the descriptive statistics that are obtained from the profiling step may be used as input into an RF algorithm. A random forest algorithm may build multiple decision trees and merge them together to obtain more accurate and stable predictions regarding relationships among the dataset. Other algorithms that may be applied to the dataset include, but are not limited to, a classifier model, XGBoost (and other tree-based ensemble machine-learning algorithms that utilize gradient boosting), and other ML models from libraries such as MLlib (Apache Spark's machine learning library).

After application of the RF algorithm (or other ML algorithm), an output may be generated that may indicate the strongest relationships among data columns. For example, a relationship indicating a relationship between a column label "Zip Code" and column label "Street Address" may be indicated because zip codes are usually associated with street addresses. A label "SSN" may be associated with column labels "First Name" and "Last Name" since a social security number is usually associated with the identity of an individual. These data columns may be basketed together based on feature importance, explanatory coefficients, and other model accuracy/relationship determinations.

Once the related data columns are identified, the headers of the data may be concatenated for each row. ML algorithm module 225 may be configured to create a new transactional dataset called an "itemset" based on the concatenation of column headers for each data row. The ML algorithm module 225 may then apply a second ML algorithm, such as a Frequent Pattern Growth algorithm to further predict the frequency of the relationships. In other words, the application of the RF algorithm may indicate whether certain data items are related, and the additional application of the Frequent Pattern Growth algorithm may indicate the extent of how frequent those relationships occur in a dataset.

ML algorithm module 225 may be configured to compute a probability matrix based on the frequency of data relationships. The frequency of the baskets of relationships may indicate whether certain data anomalies exist in a dataset. Less frequent relationships may indicate a higher likelihood of a data anomaly, and more frequent relationships may indicate a lesser likelihood of a data anomaly.

After the dataset is processed by ML algorithm module 225, DQ suggestion module 230 may be configured to receive the processing information from ML algorithm module 225 indicating the frequency of certain data relationships (i.e., where certain data columns are associated with other data columns). The DQ suggestion module 230 may output an intelligent suggestion in some instances, suggesting that certain actions be taken on the data to remedy any identified data anomalies. In other examples, a table may be displayed, indicating the associations between certain data records and the frequency of those data relationships (e.g., the system may highlight a potential relationship in an output table displaying two records with the same SSN, Name, and Gender but two different email addresses). Less frequent data relationships may be highlighted to indicate outlier data points or suspicious data that may be erroneous.

Figure 3A:
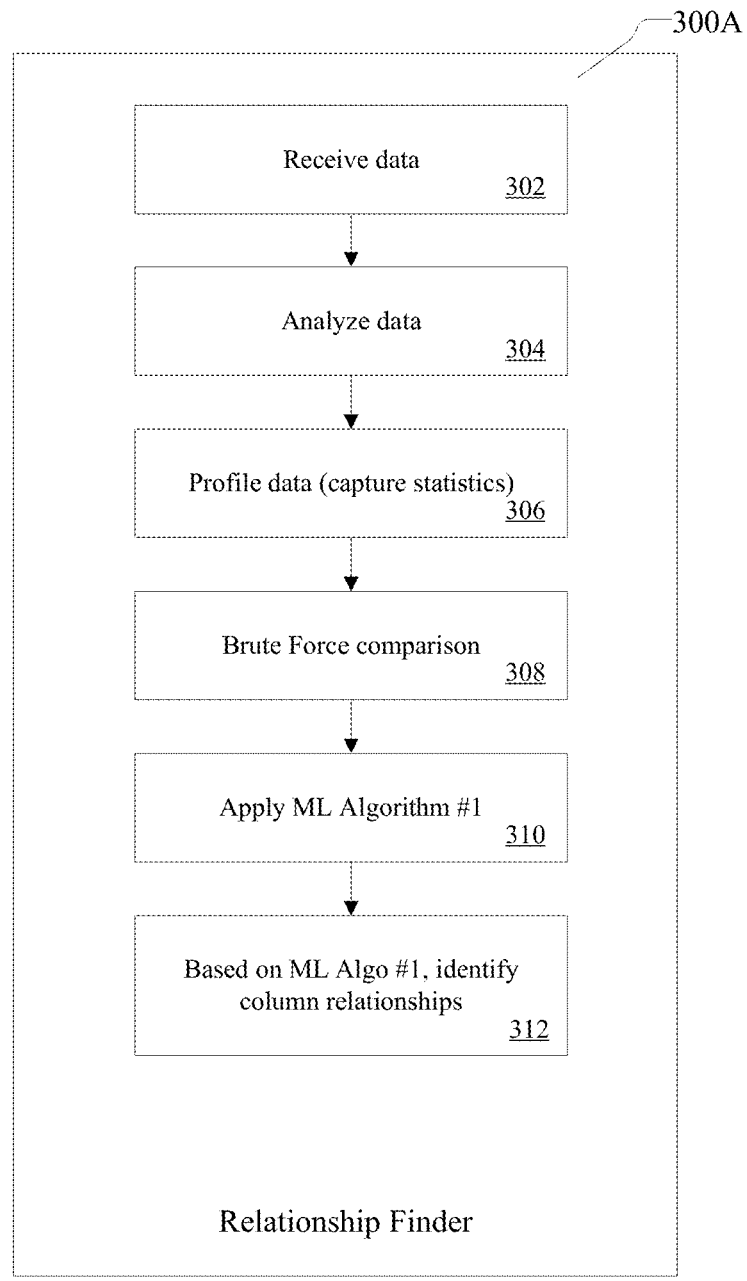
FIGS. 3A and 3B illustrate an example method for predicting correct or missing data, and data quality of a dataset, as described herein.
Figure 3B:
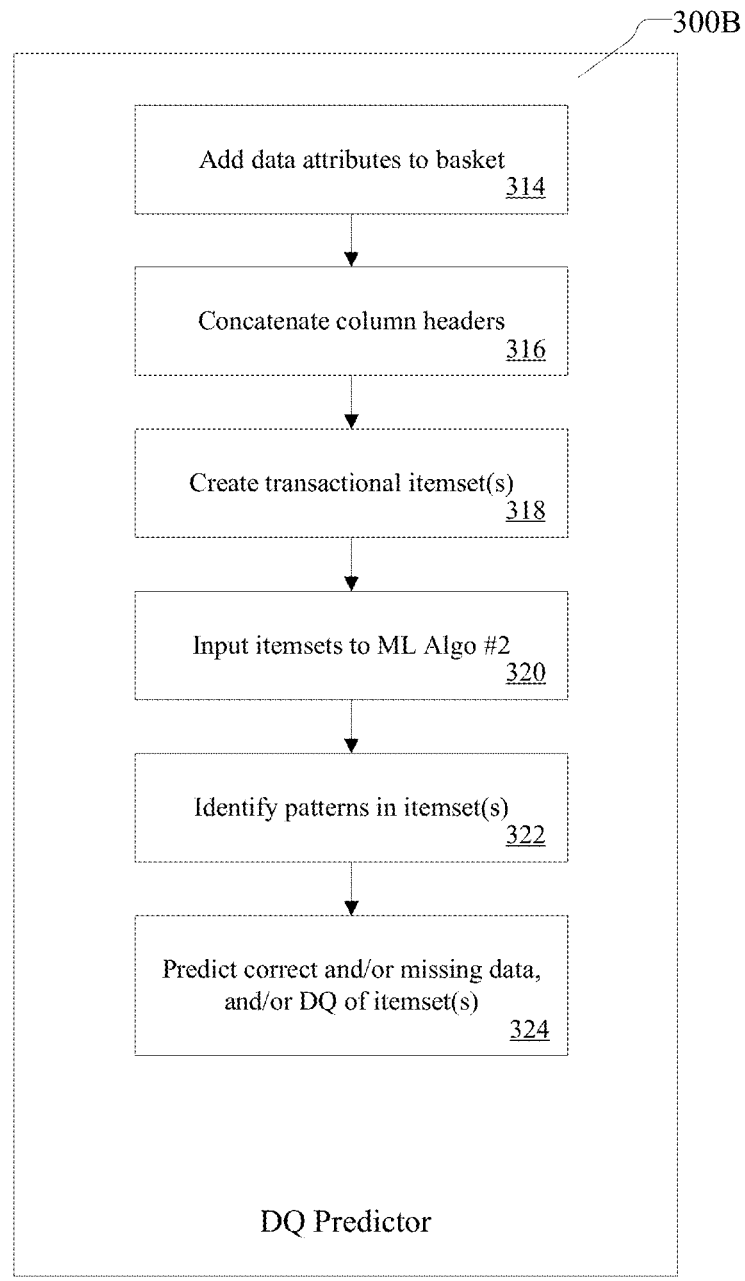

FIGS. 3A and 3B illustrate an example method for predicting data quality of a dataset, as described herein. Method 300 is broken up into two separate sub-methods—sub-method 300A and sub-method 300B. Sub-method 300A is the relationship finder sub-method, which identifies relationships (if any) among a dataset. Sub-method 300A begins with receive data step 302. Data may be received in the form of a data lake, database, flat file, data stream, or other ingestible format of data. The data may then be analyzed at step 304 to ensure the data is in a format that may be read by the systems and methods described herein (e.g., step 304 may comprise a user-interface button that may be pressed to initiate the profiling). The data may be profiled at step 306, where certain data statistics may be captured, such as min, max, mean, cardinality indicators, categorical columns, etc. After the data values are profiled, then a brute force comparison may be applied to the dataset at step 308. For example, an example attribute A may be compared to all other attributes in a dataset, and example attribute B may be compared to all other attributes in the dataset. The brute force comparison output may display a table indicating which column headers and data values may be related. For example, the following table may be displayed for an example comparison of column 1 ("col1") with other columns in the dataset:

| Comparison Column | Relationship Percentage (Brute Force) |
| --- | --- |
| Col 5 | 98% |
| Col 2 | 72% |
| Col 3 | 10% |
| Col 6 | 1% |

At step 310, a first machine learning algorithm may be applied to the dataset. This first ML algorithm may be a Random Forest algorithm that may be applied to understand which data columns have a potential relationship between each other. At step 312, those column relationships may be identified based on the output of the RF algorithm. For example, a zip code data column may be associated with a street address. A bank account number data column may be associated with a bank name data column. A SSN data column may be associated with a first name data column and a last name data column. An IP address data column may be associated with a machine identifier number data column.

Once the relationships are identified among data columns, the resulting output of these relationships are added to a basket at step 314 based on automatic selections of data column relationships and/or user-selected relationships of the data columns. This basket of data column relationships is then analyzed at step 316, where the data column headers are concatenated to create a transactional itemset at step 318. The transactional itemset at step 318 is then provided as input to a second ML algorithm, such as a Frequent Pattern Growth model at step 320. The FPG model may compute a probability matrix of itemset combinations to determine particular patterns in the itemset at step 322. The patterns identified at step 322 may indicate the frequency (or lack thereof) of relationships among certain data columns.

Based on the frequency of the data relationships identified by the FPG model, as well as the information derived from the RF model, a data prediction may be generated at step 324, which may predict the correct or missing data and data quality of the dataset. For instance, less frequent relationships in the data may indicate that certain data values are anomalies or erroneous. More frequent relationships in the data may indicate that the data values comprise less anomalies and errors.

In one specific example, a bank may be analyzing loan data. The data may be limited to a certain geographic region. Certain relationships in the data may be identified by an RF algorithm at step 310, such as relationships between certain banking customer account numbers and SSN numbers. Additionally, the frequency of these relationships may be identified by the application of an FPG model at step 320. However, although a certain relationship may be identified by the DQ prediction system described herein, the relationship may be suspicious because an alleged account number may not adhere to the standard formatting guidelines of an account number (e.g., an account number with 6 digits instead of 8 digits), for example. As such, the system may flag this data value as an anomaly because the data value has a low confidence score. Another example of an anomaly detection may be based on the amount of a transaction in a certain geographic region. Although the relationships between data columns may exist, the frequency of a certain transaction amount being related to a particular type of banking transaction (e.g., deposit, withdrawal, loan, etc.) may be low. Due to the low frequency of a certain relationship existing in the dataset, the system may also flag this transaction as a potential anomaly.

In yet another example, a dataset may comprise a column with zip codes and state identifier codes. One data entry may comprise the zip code "21087" with the state identifier code as "MD" (Maryland), while another data entry may comprise the same zip code "21087" but with state code "NY" (New York). The system described herein may identify this data anomaly, apply at least one machine-learning algorithm to the dataset, and suggest at least one corrective action (i.e., identifying which data entry is correct and which is wrong). Even though the zip code itself is in the zip code column and is in the correct format, one of these data records is incorrect (21087 is a zip code associated with Maryland).

In an additional example, a dataset may comprise an asset symbol, such as a publicly traded stock or a cryptocurrency. An asset may trade on multiple exchanges under the same symbol. However, if a certain asset appears on an exchange where the asset has not traded before, the system may identify this anomaly and suggest corrective action(s). From a data quality standpoint, the asset symbol may be correct and in the correct format, but the underlying quality of the data record (asset symbol plus exchange) may be incorrect because the exchange does not actually support the trading of that asset.

Figure 4A:
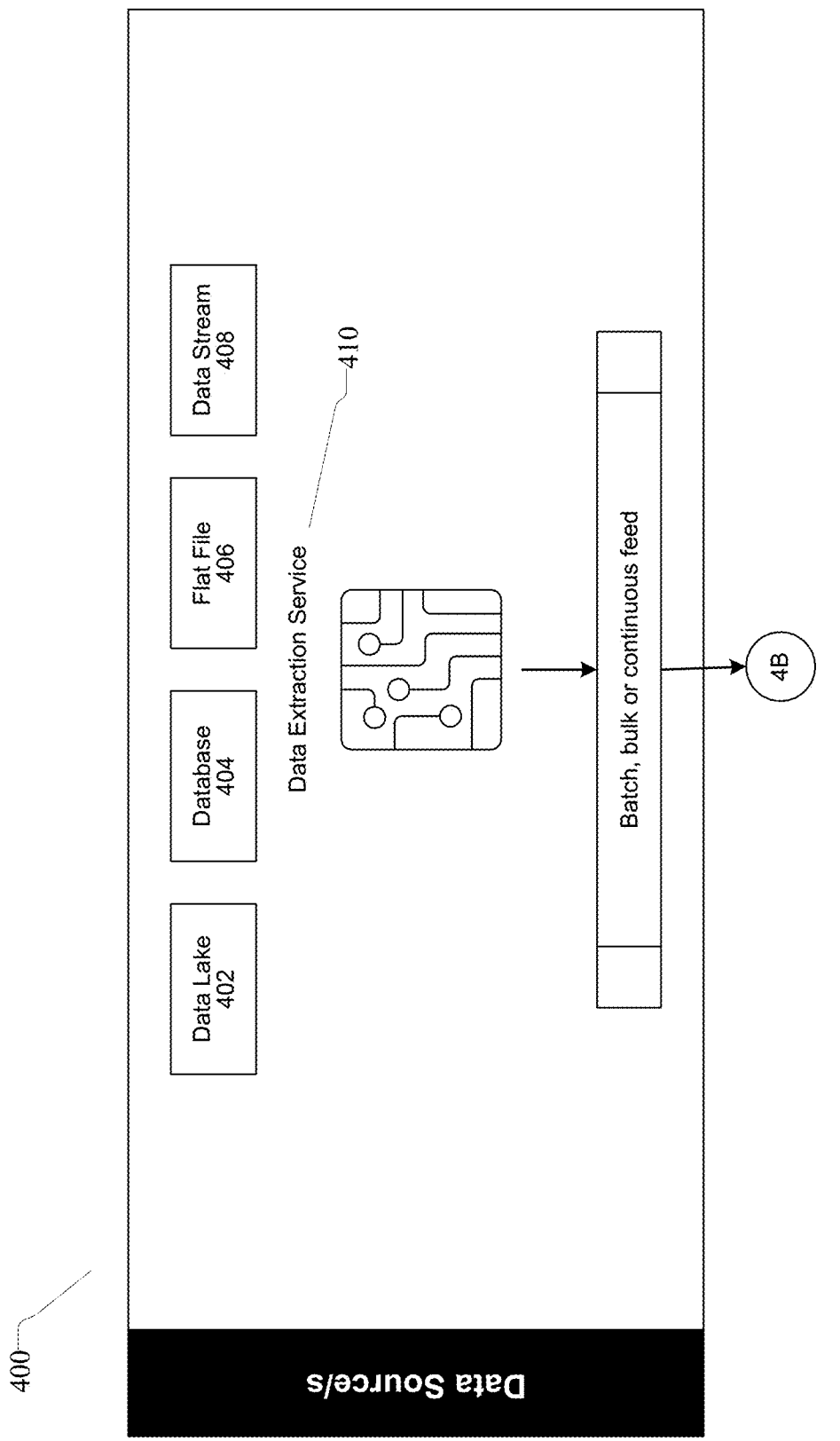
FIGS. 4A, 4B, and 4C illustrate an example architecture for implementing systems and methods for predicting correct or missing data, and data quality.
Figure 4B:
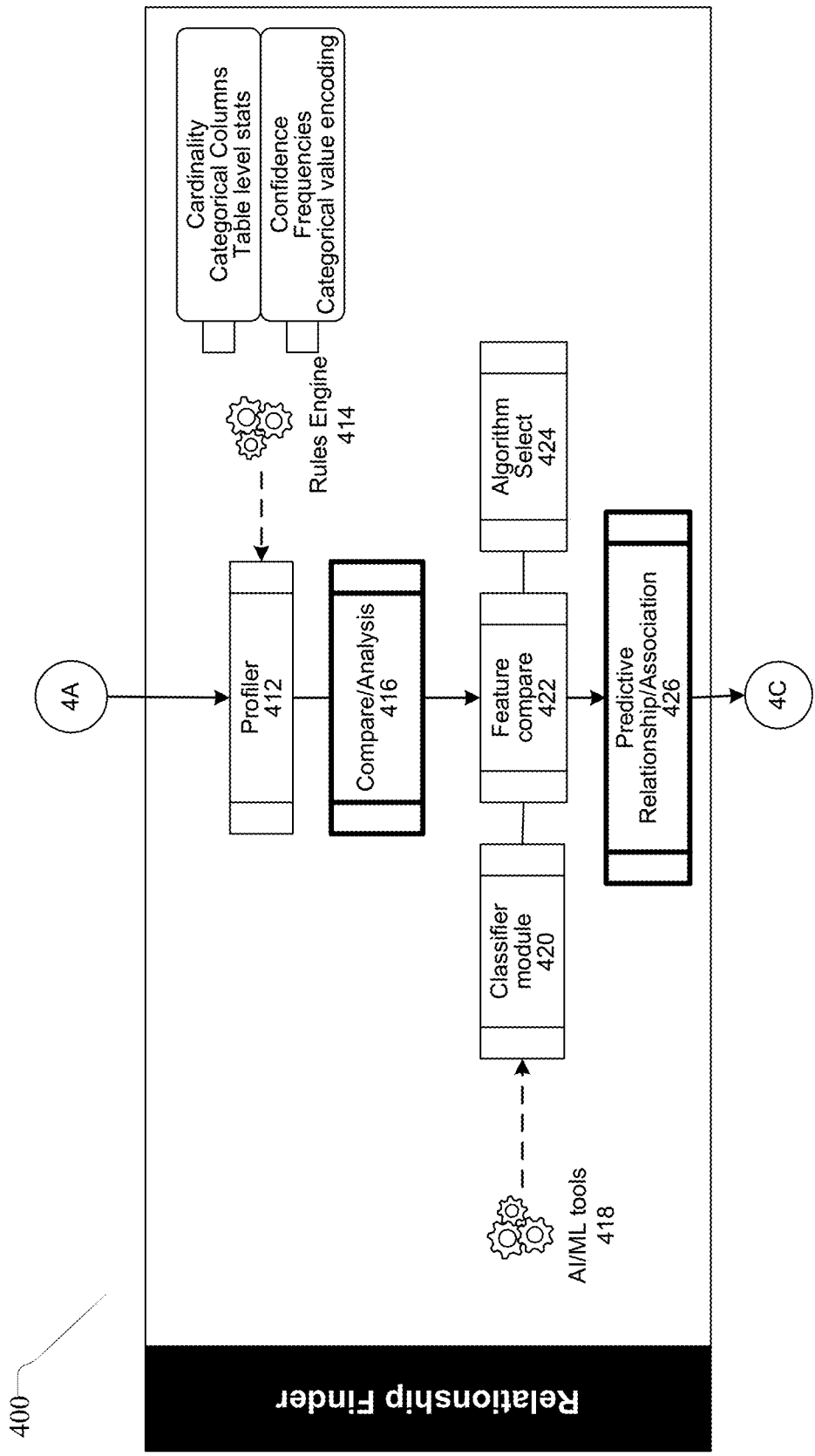
Figure 4C:
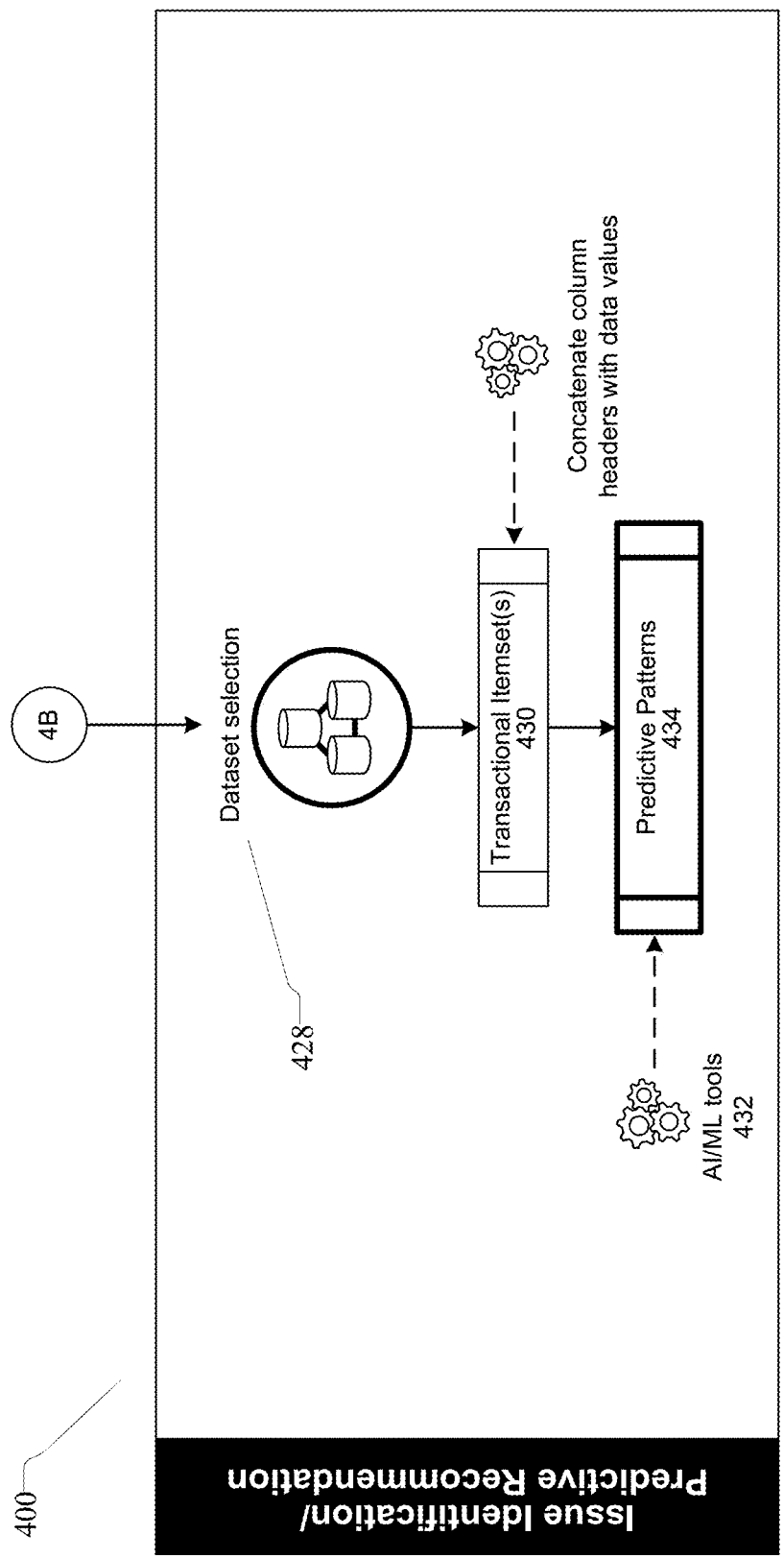

FIGS. 4A, 4B, and 4C illustrate an example architecture for implementing systems and methods for predicting correct or missing data and data quality. Environment 400 comprises data sources, which may include, but are not limited to, a data lake 402, database 404, flat file 406, and data stream 408. Once the data is received by the system, a data extraction service 410 may be applied to the raw input data. The extraction service 410 may reformat the data into a suitable format for processing. The data may be continuous/batch/bulk feed into a profiler 412. The profiler 412 may be configured to implement a rules engine 414, which may include analyzing statistics of the data. Such statistics may include max, min, mean, and cardinality of data values. Certain data columns may be categorized, and confidence values may be initially assigned to certain data. Frequencies of certain data types may also be profiled by profiler 412.

The profiled data may be compared and analyzed at 416. In some examples, the profiled data may be further analyzed by applying certain rules to prepare the dataset for application of an ML algorithm. For instance, certain missing values in a dataset may be filled in with dummy values (e.g., n/a for categorical values, 0 for numerical values, or substituting mean values). In another example, the profiled data may be decomposed to provide the ML algorithm with more relevant information. For instance, if sales data varies depending on a certain day of the week, the day of the week (e.g., Friday) may be segregated from the actual date (Apr. 15, 2021). Certain min-max normalization may also be applied to a dataset, such as applying a confidence interval or winnowing based upon a max and/or min extreme value. For instance, the top 2.5% and bottom 2.5% of numerical values may be discarded in some instances before applying a certain ML algorithm.

Various artificial intelligence/machine learning tools 418 may be applied to a classifier module 420. Classifier module 420 may classify the profiled data into certain categories of data, such as strings, integers, and other discrete objects.

Features of the dataset may be compared at 422, which may instruct which ML algorithm to apply to the dataset. Once an ML algorithm is applied to the dataset, the output may indicate the predictive relationship and/or association among the dataset at 426.

Once the relationships of the dataset are identified, then the issue identification process may begin. First, a dataset may be selected at 428. The dataset that is selected may be a subset of the initial dataset input into the system. The selected dataset may be a dataset of identified associated data columns and/or possible anomalies. The selected dataset may be transformed into a transactional itemset 430, where column headers with data values may be concatenated together. Once the itemset is created, an additional AI/ML toolset may be applied to the itemset, such as an ML algorithm like Frequent Pattern Growth, which may identify the frequency of the relationships in the dataset (i.e., how frequently certain data columns appear in relationship with other data columns). Based on the output of the FPG model, predictive patterns may be established at 434, where data anomalies may be identified. Further, suggested remedial actions for cleaning the data may be presented to a user of the system. For example, both the data anomaly and/or the potential error may be presented to the user. The most probable outcome and/or prediction of a certain dataset may also be presented to the user. In particular, the user may accept a certain prediction value in order to clean the dataset (e.g., the system may predict the proper value of a certain data entry that is likely erroneous, and the user may accept that proposed change).

Figure 5:
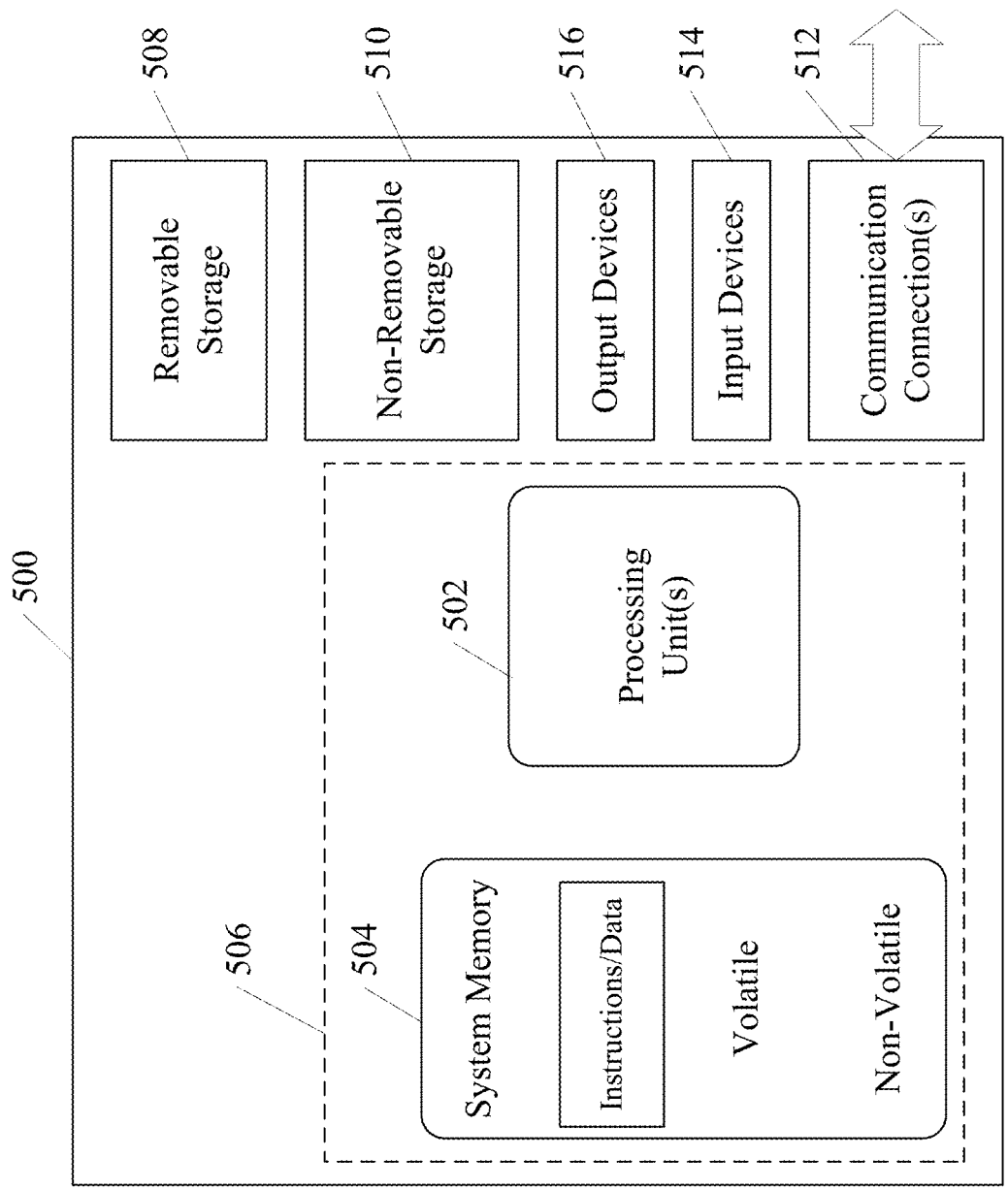
FIG. 5 illustrates one example of a suitable operating environment in which one or more of the present embodiments may be implemented.

FIG. 5 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for improving data quality in a first dataset, comprising:
   receiving the first dataset;
   applying a machine-learning algorithm to the first dataset, wherein the machine-learning algorithm identifies at least one relationship between a first data column and a second data column in the first dataset;
   based on the identification of the at least one relationship between the first data column and the second data column in the first dataset, generating a second dataset, wherein the second dataset is a subset of the first dataset;
   concatenating a plurality of column headers in the second dataset to obtain an itemset;
   computing a probability matrix of itemset combinations;

based on the probability matrix of itemset combinations, identifying at least one frequency value associated with the at least one relationship between the first data column and the second data column in the first dataset; and improving the data quality in the first dataset by identifying at least one anomaly in the first dataset based on the at least one frequency value associated with the at least one relationship.

2. The method of claim 1, wherein the identifying the at least one anomaly in the first dataset includes identifying at least one missing value in the first dataset.

3. The method of claim 2, further comprising generating at least one suggestion for remediating the at least one anomaly including at least one suggested value to fill in the at least one missing value in the first dataset.

4. The method of claim 3, wherein the at least one suggested value is at least one of: zero, a mean value, a min value, and a max value.

5. The method of claim 1, wherein the machine-learning algorithm is a random-forest algorithm.

6. The method of claim 1, wherein the machine-learning algorithm is a frequent pattern growth algorithm.

7. The method of claim 3, wherein the at least one anomaly in the first dataset is a relationship anomaly in at least one data record.

8. The method of claim 7, wherein the at least one suggestion is a suggestion for correcting the relationship anomaly in the at least one data record.

9. The method of claim 8, wherein the suggestion for correcting the relationship anomaly comprises at least one substitute value.

10. The method of claim 3, further comprising:
receiving at least one user input accepting the at least one suggestion; and
based on the at least one user input, applying the at least one suggestion to the first dataset.

11. The method of claim 1, wherein the first dataset and the second dataset are at least one of: a datafile, a data lake, a flat file, and a data stream.

12. A system for correcting data anomalies in a first dataset, comprising:
a memory configured to store non-transitory computer readable instructions; and
a processor communicatively coupled to the memory, wherein the processor, when executing the non-transitory computer readable instructions, is configured to:
receive the first dataset;
apply a machine-learning algorithm to the first dataset, wherein the machine-learning algorithm identifies at least one relationship between a first data column and a second data column in the first dataset; and
based on the identification of the at least one relationship between the first data column and the second data column in the first dataset, generate a second dataset, wherein the second dataset is a subset of the first dataset;
combine a plurality of column headers in the second dataset to obtain an itemset;
compute a probability matrix of itemset combinations:
based on the probability matrix of itemset combinations, identify at least one frequency value associated with the at least one relationship between the first data column and the second data column in the first dataset; and
correct the data anomalies in the first dataset by identifying at least one anomaly in the first dataset based on the at least one frequency value associated with the at least one relationship.

13. The system of claim 12, wherein the identifying the at least one anomaly in the first dataset includes identifying at least one anomaly in at least one data record including a relationship anomaly between at least one data value in the first data column and at least one data value in the second data column.

14. The system of claim 13, wherein the relationship anomaly is associated with a geographic location.

15. The system of claim 13, wherein the relationship anomaly is associated with an asset symbol, wherein the asset symbol is at least one of: a stock ticker and a cryptocurrency ticker.

16. The system of claim 12, wherein the machine-learning algorithm is a random-forest algorithm.

17. The system of claim 12, wherein the machine-learning algorithm is a frequent pattern growth algorithm.

18. The system of claim 13, wherein the at least one anomaly is at least one of: a missing value, an incorrect value, and a formatting error.

19. The system of claim 13, further configured to generate at least one output table displaying the at least one anomaly in the at least one data record in the first dataset and a corrected version of the at least one data record without the at least one anomaly.

20. A computer-readable media storing non-transitory computer executable instructions that when executed cause a computing system to perform a method for predicting and correcting data anomalies comprising:
receiving a first dataset;
comparing a first data column in the first dataset to a plurality of other data columns in the first dataset;
based on the comparison results of the first data column and the plurality of other data columns, identifying a first relationship between the first data column and a second data column in the first dataset;
applying a machine-learning algorithm to the first data column and the second data column, wherein the machine-learning algorithm identifies a second relationship between the first data column and the second data column in the first dataset;
based on the identification of the second relationship between the first data column and the second data column in the first dataset, generating a second dataset, wherein the second dataset is a subset of the first dataset;
concatenating a plurality of column headers in the second dataset to obtain an itemset;
computing a probability matrix of itemset combinations:
based on the probability matrix of itemset combinations, identifying at least one frequency value associated with the second relationship between the first data column and the second data column in the first dataset; and
correct the data anomalies in the first dataset by identifying at least one anomaly in the first dataset based on the at least one frequency value.

* * * * *